United States Patent [19]

Tabei et al.

[11] Patent Number: 5,319,051
[45] Date of Patent: Jun. 7, 1994

[54] TERMINALLY REACTIVE POLYSILANE AND PROCESS FOR MAKING

[75] Inventors: Eiichi Tabei; Shigeru Mori, both of Kawasaki, both of Japan

[73] Assignee: Shin-Etsu Chemical Company, Limited, Tokyo, Japan

[21] Appl. No.: 6,513

[22] Filed: Jan. 21, 1993

[30] Foreign Application Priority Data

Jan. 21, 1992 [JP] Japan .................................. 4-30105

[51] Int. Cl.$^5$ ............................................. C08G 77/06
[52] U.S. Cl. ........................................ 528/21; 528/34; 525/477; 525/478; 525/479
[58] Field of Search ..................... 528/34, 21; 525/477, 525/478, 479

[56] References Cited

PUBLICATIONS

Kumada, et al., (1964) Journal of Organometallic Chemistry, 2:478–484.

Ishikawa, et al., (1970) Journal of Organometallic Chemistry, 23:63–69.

Wolff, et al., (1987) Applied Organometallic Chemistry, 1:7–14.

Zhang, et al., (1984) Journal of Polymer Science:-Polymer Chem., Edition 22:159–170.

R. West, (1986) Journal of Organometallic Chemistry, 300:327–346.

Kagaku to Kogyo, Chemistry & Industry, vol. 42, No. 4, pp. 744–747.

*Primary Examiner*—Melvyn I. Marquis
*Attorney, Agent, or Firm*—Birch, Stewart, Kolasch & Birch

[57] ABSTRACT

The invention provides terminally reactive polysilanes of the formula:

$$XSiO[(R^1R^2Si)_n(R^3R^4Si)_m]_kOSiX \quad (I)$$

with $R^5$, $R^6$ substituents on each terminal Si, wherein $R^1$, $R^2$, $R^3$, $R^4$, $R^5$ and $R^6$ are independently alkyl groups or aryl groups, X is a hydrogen or alkenyl group, n, m and k are $0 \leq n \leq 10$, $0 \leq m \leq 10$, $n+m \geq 10$, and $k \geq 1$, especially hydrosiloxy or alkenylsiloxy-terminated polysilanes. They are prepared by reacting hydroxy-terminated polysilanes with dialkylhydrochlorosilanes, alkylarylhydrochlorosilanes, dialkylalkenylchlorosilanes or alkylarylalkenylchlorosilanes in the presence of amine.

19 Claims, No Drawings

TERMINALLY REACTIVE POLYSILANE AND PROCESS FOR MAKING

BACKGROUND OF THE INVENTION

1. Field of the Invention

This invention relates to α, ω-reactive group terminated polysilane, for example, hydrosiloxy and alkenylsiloxy-terminated polysilanes, which are capable of accepting any desired functional group and useful as a source material for forming copolymers with other polymers. It also relates to a process for preparing the same.

2. Prior Art

Most industrial processes for preparing polysilanes utilize coupling reaction of dihalogenosilanes with alkali metals as reported in Journal of Polymer Science: Polymer Chemistry Edition, Vol. 22, 159-170 (1984) and Journal of Organometallic Chemistry, Vol. 300, 327 (1986). These processes produce polysilanes in the form of mixtures of cyclic polymers and halo- or hydrogen-terminated polymers. It is difficult to quantitatively obtain terminally modified polymers from these mixtures.

With respect to the synthesis of single and modified polysilanes, Sakurai et al. attempted living polymerization from polymers containing a disilane unit for introducing hydrogen or carboxylic acid as well as copolymerization of such polymers with polymethyl methacrylate (PMMA) as reported in Kagaku to Kogyo (Chemistry & Industry), Vol. 42, No. 4, 744. This attempt, however, has several industrial problems including limited type of substituents and limited availability of monomers.

Exemplary synthesis of both and single end reactive polysilanes is reported in Journal of Organometallic Chemistry, Vol. 2, 478-484 (1964) and Journal of Organometallic Chemistry, Vol.23, 63-69 (1970). More specifically, chloro-terminated oligosilanes can be prepared by reacting permethyloligosilanes with acetyl chloride in the presence of aluminum chloride. Also chloro-terminated oligosilanes can be prepared by reacting phenyl-terminated oligosilanes with hydrogen chloride or chlorosilane in the presence of aluminum chloride. These chloro-terminated oligosilanes, however, have a low degree of polymerization.

SUMMARY OF THE INVENTION

Focusing on the reaction that on exposure to ultraviolet (UV) radiation, polysilanes decompose and convert to those of a lower molecular weight while yielding highly reactive silylene and silyl radicals as reported in Applied Organometallic Chemistry, Vol. 1, 7-14 (1987), the inventors have found that when high-molecular weight polysilanes are photo-decomposed by selecting a chlorinated hydrocarbon as a solvent prone to chlorine withdrawal and exposing the polysilanes to UV radiation in the chlorinated hydrocarbon, silyl radicals generate and then form chloro-terminated polysilanes having a high degree of polymerization.

More specifically, coupling reaction of dichlorosilane with alkali metal yields a high-molecular weight polysilane which is a mixture of a cyclic polymer and a halo- or hydrogen-terminated polymer as previously mentioned. When such a polysilane is exposed to UV radiation, the cyclic polymer opens its ring and converts into a chloro-terminated polysilane through photo-decomposition. At the same time, the halo- or hydrogen-terminated polymer remains unreactive where it has a terminal halogen atom, but where it has a terminal hydrogen atom, the hydrogen atom is replaced by a chlorine atom under the action of light or heat. As a result, from high-molecular weight polysilane, there is obtained a chloro-terminated polysilane having a lower molecular weight which is dictated by the dose of UV radiation. This chloro-terminated polysilane is the subject matter of the first one of our copending applications referred to above.

Making investigations on the synthesis of other polysilanes from the chloro-terminated polysilane, we have found that by dissolving the chloro-terminated polysilane in a polysilane-miscible solvent, and adding water to the solution for hydrolysis to take place, there is formed a hydroxy-terminated polysilane having a high degree of polymerization, which has never been reported on synthesis in the literature. This hydroxy-terminated polysilane is the subject matter of the second one of our copending applications referred to above.

Then an object of the present invention is to convert the hydroxy-terminated polysilane to another reactive group-terminated polysilane. Another object is to provide a novel and improved both end reactive polysilane with a high degree of polymerization capable of accepting any desired functional group and suitable as a source material for forming copolymers with other polymers. A further object is to provide a process for preparing such a terminally reactive polysilane.

Accordingly, the present invention provides terminally reactive polysilane of the formula:

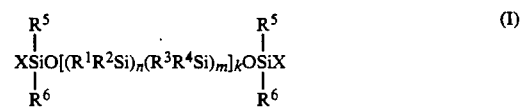

wherein $R^1$, $R^2$, $R^3$, $R^4$, $R^5$ and $R^6$ are independently monovalent hydrocarbon groups having 1 to 12 carbon atoms selected from substituted or unsubstituted alkyl and aryl groups, X is a hydrogen atom or alkenyl group, letters n, m and k are numbers in the range: $0 \leq n \leq 10$, $0 \leq m \leq 10$, $n+m \geq 10$, and $k \geq 1$. Typical examples of the polysilane are hydrosiloxy and alkenylsiloxy-terminated polysilanes.

In a second aspect, the present invention provides a process for preparing a terminally reactive polysilane comprising the step of reacting a hydroxy-terminated polysilane with a member selected from the group consisting of dialkylhydrochlorosilanes, alkylarylhydrochlorosilanes, dialkylalkenylchlorosilanes and alkylarylalkenylchlorosilanes in the presence of an amine.

DETAILED DESCRIPTION OF THE INVENTION

The terminally reactive polysilanes of the present invention are represented by formula (1).

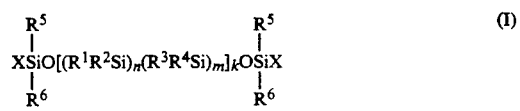

More specifically, these polysilanes are hydrosiloxy-terminated polysilanes of formula (2) and alkenylsiloxy-terminated polysilanes of formula (3).

$$\underset{\underset{R^6}{|}}{\overset{\overset{R^5}{|}}{HSiO}}[(R^1R^2Si)_n(R^3R^4Si)_m]_k\underset{\underset{R^6}{|}}{\overset{\overset{R^5}{|}}{OSiH}} \qquad (2)$$

$$\underset{\underset{R^6}{|}}{\overset{\overset{R^5}{|}}{YSiO}}[(R^1R^2Si)_n(R^3R^4Si)_m]_k\underset{\underset{R^6}{|}}{\overset{\overset{R^5}{|}}{OSiY}} \qquad (3)$$

In the formulae, Y is an alkenyl group having 2 to 6 carbon atoms such as vinyl and allyl groups $R^1$, $R^2$, $R^3$ and $R^4$, which may be identical or different, are monovalent hydrocarbon groups having 1 to 12 carbon atoms, preferably 1 to 8 carbon atoms selected from substituted or unsubstituted alkyl and aryl groups. The alkyl groups include methyl, ethyl and propyl groups and the aryl groups include phenyl and tolyl groups $R^5$ and $R^6$, which may be identical or different, are monovalent hydrocarbon groups having 1 to 12 carbon atoms, preferably 1 to 6 carbon atoms selected from substituted or unsubstituted alkyl and aryl groups, examples of which are as mentioned above. Letters n, m and k are numbers in the range: $0 \leq n \leq 10$, $0 \leq m \leq 10$, $n+m \geq 10$, and $k \geq 1$. Where electrical properties are contemplated, k is preferably 5 or more, more preferably 10 or more.

Preparation of the hydrosiloxy-terminated polysilanes of formula (2) and alkenylsiloxy-terminated polysilanes of formula (3) starts with synthesis of a chloro-terminated polysilane of formula (4):

$$Cl[(R^1R^2Si)_n(R^3R^4Si)_m]_kCl \qquad (4)$$

wherein $R^1$, $R^2$, $R^3$, $R^4$, n, m and k are as defined above.

The chloro-terminated polysilane of formula (4) is prepared by effecting coupling reaction of a dichlorosilane with an alkali metal such as sodium for forming a polysilane. The dichlorosilanes used herein include dialkyldichlorosilanes, alkylaryldichlorosilanes, alkyl(substituted aryl)dichlorosilanes, and di(substituted aryl)dichlorosilanes.

The coupling reaction results in a polysilane of the general formula (5):

$$(R^1R^2Si)_{n'}(R^3R^4Si)_{m'} \qquad (5)$$

wherein $R^1$, $R^2$, $R^3$ and $R^4$ are as defined above, $0 \leq n'$, $0 \leq m'$, $10 \leq n'+m'$, preferably $30 \leq n'+m'$. It preferably has a number average molecular weight (Mn) of 1,000 to 1,000,000, more preferably 5,000 to 1,000,000.

Next, the polysilane is dissolved in a chlorinated hydrocarbon solvent and exposed to UV radiation in an inert gas atmosphere. Examples of the chlorinated hydrocarbon used herein include dichloromethane, chloroform, carbon tetrachloride, 1,2-dichloroethane, 1,1,2-trichloroethane, and 1,1,2,2-tetrachloroethane alone or in admixture of two or more.

Preferably, the polysilane is dissolved in a chlorinated hydrocarbon to form a solution at a concentration of about 1 to 20% by weight, more preferably about 1 to 10% by weight. The polysilane solution is sealingly filled in a Pyrex ® or quartz reaction tube and irradiated with UV radiation in an inert gas atmosphere using a high pressure mercury lamp (312 nm), for example. The inert gas may be nitrogen or argon gas though not limited thereto. The dose of UV radiation may be properly determined since the resulting chloro-terminated polysilane has a molecular weight which depends on the UV dose.

After exposure to a predetermined dose of UV, the reaction solution is concentrated to ½ to 1/5 in volume. Hexane is added to the concentrate such that about 150 grams of hexane is available per 10 grams of the polysilane, thereby causing the chloro-terminated polysilane (Mn ≥ 1,000) to precipitate. Through filtration and drying, the end chloro-terminated polysilane is obtained as white powder.

From the chloro-terminated polysilane, a hydroxy-terminated polysilane of the following formula (6):

$$OH[(R^1R^2Si)_n(R^3R^4Si)_m]_kOH \qquad (6)$$

wherein $R^1$, $R^2$, $R^3$, $R^4$, n, m and k are as defined above is synthesized.

More specifically, the chloro-terminated polysilane is first dissolved in a polysilane-miscible solvent. Examples of the chloro-terminated polysilane which can be used herein include chloro-terminated dialkylpolysilanes, chloro-terminated alkylarylpolysilanes, and chloro terminated diarylpolysilanes. The polysilane-miscible solvents which can be used herein include tetrahydrofuran (THF), toluene and xylene. Both the polysilanes and solvents may be used alone or in admixture of two or more. The solution preferably has a concentration of about 1 to 20% by weight, more preferably about 5 to 10% by weight.

Then a hydrolysis promoter, for example, triethylamine and pyridine may be added to the solution, preferably in an amount of about 0.1 to 20%, especially about 5 to 15% by weight based on the chloro-terminated polysilane.

Then water is added to the solution followed by agitation. At least a theoretical amount of water should preferably be added. The reaction temperature is preferably from room temperature to the reflux temperature.

After the completion of reaction, the reaction solution was combined with an organic solvent such as toluene and washed with water. The organic layer is dried over a desiccant such calcium chloride. With the desiccant filtered off, the organic layer is concentrated, obtaining a hydroxy-terminated polysilane of formula (6) as white powder.

From the hydroxy-terminated polysilane of formula (6), hydrosiloxy-terminated polysilanes of formula (2) and alkenylsiloxy-terminated polysilanes of formula (3) are synthesized. First, the hydroxy-terminated polysilane is dissolved in an inert solvent. The hydroxy-terminated polysilanes which can be used herein include hydroxy-terminated dialkylpolysilanes, hydroxy-terminated alkylarylpolysilanes, and hydroxy-terminated diarylpolysilanes. The inert solvents include toluene, xylene, and benzene. Both the polysilanes and solvents may be used alone or in admixture of two or more. The solution preferably has a concentration of about 1 to 20% by weight, more preferably about 5 to 10% by weight.

Then an amine such as triethylamine and pyridine is added to the polysilane solution, preferably in an amount of about 0.1 to 10%, especially about 1 to 5% by weight based on the hydroxy-terminated polysilane.

Then a chlorosilane is added to the polysilane solution followed by agitation. The chlorosilanes which can be used herein include dialkylhydrochlorosilanes, e.g., dimethylchlorosilane; alkylarylhydrochlorosilanes, e.g., methylphenylchlorosilane; dialkylalkenylchlorosilanes, e.g., dimethylvinylchlorosilane and methacryloxymethyldimethylchlorosilane; and alkylarylalkenylchlorosilanes, e.g., methylphenylvinylchlorosilane. At least a theoretical amount of the chlorosilane is preferably added based on the hydroxy-terminated polysilane. Preferably, agitation is continued for about 4 to 8 hours at 0° to 30° C. in the event where hydrochlorosilanes are used and for about 4 to 8 hours at 40° to 80° C. in the event where alkenylchlorosilanes are used.

After the completion of reaction, the reaction solution was washed with water. The organic layer is dried over a desiccant such as calcium chloride. With the desiccant filtered off, the organic layer is concentrated, obtaining a hydrosiloxy-terminated polysilane of formula (2) or alkenylsiloxy-terminated polysilane of formula (3) as white powder.

The thus obtained hydrosiloxy-terminated polysilanes of formula (2) and alkenylsiloxy-terminated polysilanes of formula (3) according to the present invention have hydrogen atoms or alkenyl groups at both ends thereof and thus highly reactive at the both ends. They are useful source materials for forming copolymers or crosslinked polymers with other polymers.

EXAMPLE

Examples of the present invention are given below by way of illustration and not by way of limitation. All percents are by weight. Mn and Mw are number and weight average molecular weights, respectively, and Ph is phenyl.

Preparation of chloro-terminated polysilanes is first described and preparation of hydroxy-terminated polysilanes is then described.

REFERENCE EXAMPLES 1-5

Methylphenylpolysilane having Mn=24,000 and Mw/Mn=3.32 was previously prepared by coupling reaction of methylphenyldichlorosilane with sodium. 7.0 grams of methylphenylpoly-silane was dissolved in 133 grams of carbon tetrachloride at a concentration of 5%. In a nitrogen gas atmosphere, a Pyrex reaction tube with a diameter of 15 mm was filled with the polysilane solution, closed with a plug, and exposed to UV radiation (312 nm) in a dose of 1 J/cm$^2$ using a high-pressure mercury lamp. The reaction solution was concentrated to about 50 grams. Addition of 100 grams of hexane to the solution caused precipitation of a chloro-terminated polysilane. It was isolated by filtration and dried, obtaining a white powder (Reference Example 1).

The procedure of Reference Example 1 was repeated except that the UV dose was changed to 2, 3, 5 and 10 J/cm2, yielding white powders

REFERENCE EXAMPLES 2-5

Table 1 reports the Mn, Mw/Mn and yields of these white powders. Their chlorine contents as measured by titration are also reported together with the theoretical values.

TABLE 1

| UV dose (J/cm$^2$) | Chloro-terminated polysilane | | | | |
|---|---|---|---|---|---|
| | Mn* | Mw/Mn | Yield (%) | Cl (%) Found | Cl (%) Calc. |
| 1 | 15,970 | 2.34 | 77 | 0.45 | 0.45 |
| 2 | 12,220 | 1.94 | 65 | 0.54 | 0.58 |
| 3 | 11,980 | 1.93 | 63 | 0.58 | 0.59 |
| 5 | 8,300 | 1.70 | 60 | 0.84 | 0.86 |

TABLE 1-continued

| UV dose (J/cm$^2$) | Chloro-terminated polysilane | | | | |
|---|---|---|---|---|---|
| | Mn* | Mw/Mn | Yield (%) | Cl (%) Found | Cl (%) Calc. |
| 10 | 4,600 | 1.47 | 52 | 1.49 | 1.53 |

*Calculated as polystyrene

REFERENCE EXAMPLE 6

In 100 grams of THF was dissolved 5.0 grams of a chloro-terminated methylphenylpolysilane (Mn=7,500, Mw/Mn=1.57). To the solution, 0.2 grams of triethylamine was added, grams of water was added dropwise, and the mixture was agitated under reflux for 4 hours. At the end of reaction, 100 grams of toluene was added to the reaction solution, which was washed with 100 grams of water three times. The organic layer was dried overnight over calcium chloride. After the desiccant was filtered off, the organic layer was concentrated, obtaining 3.5 grams of a white powder.

The results of analysis of this white powder are shown below which indicate that it is a both end hydroxy-terminated methylphenyl-polysilane.

| Yield: | about 75% |
|---|---|
| Mn: | 7,550 (calculated as polystyrene) |
| Mw/Mn: | 1.64 |
| IR analysis: | peak at 3624 cm$^{-1}$ (Si—OH) |
| OH quantity: | 0.0260 mol/100 g (calculated: 0.0265 mol/100 g) |

REFERENCE EXAMPLE 7

In 300 grams of THF was dissolved 15.0 grams of a chloro-terminated methylphenylpolysilane (Mn=5,600, Mw/Mn=1.66). To the solution, 1.2 grams of triethylamine was added, 10 grams of water was added dropwise, and the mixture was agitated under reflux for 4 hours. At the end of reaction, 300 grams of toluene was added to the reaction solution, which was washed with 300 grams of water three times. The organic layer was dried overnight over calcium chloride. After the desiccant was filtered off, the organic layer was concentrated, obtaining 11.3 grams of a white powder.

The results of analysis of this white powder are shown below which indicate that it is a hydroxy-terminated methylphenylpolysilane.

| Yield: | about 75% |
|---|---|
| Mn: | 5,620 (calculated as polystyrene) |
| Mw/Mn: | 2.09 |
| IR analysis: | peak at 3624 cm$^{-1}$ (Si—OH) |
| OH quantity: | 0.0350 mol/100 g (calculated: 0.0356 mol/100 g) |

Next, synthesis of hydrosiloxy and alkenylsiloxy-terminated polysilanes from hydroxy-terminated polysilanes is described.

EXAMPLE 1

In 120 grams of toluene was dissolved 8.0 grams of hydroxy-terminated methylphenylpolysilane (Mn=5,620, Mw/Mn=2.09). To the solution, 1.0 grams of triethylamine was added, and 0.93 grams of dimethylhydrochlorosilane was added dropwise. Agitation was continued for 4 hours at room temperature. At the end of reaction, the reaction solution was washed with 100 grams of water three times. The organic layer was dried overnight over calcium chloride. After the desiccant was filtered off, the organic layer was concentrated, obtaining 6.6 grams of a white powder.

The results of analysis of this white powder are shown below which indicate that it is a dimethylhydrosiloxy-terminated methylphenylpolysilane.

| Yield: | about 80% |
|---|---|
| Mn: | 5,700 (calculated as polystyrene) |
| Mw/Mn: | 2.19 |
| IR analysis: | peak at 3624 cm$^{-1}$ (Si—OH) disappeared peak at 2124 cm$^{-1}$ (Si—H) |
| Proton NMR: (in C$_6$D$_6$) | −0.8–0.6 ppm (SiCH$_3$) broad 4.7–4.8 ppm (SiH) broad 6.2–7.6 ppm (Ph) broad |

EXAMPLE 2

In 15 grams of toluene was dissolved 1.7 grams of hydroxy-terminated methylphenylpolysilane (Mn=7,550, Mw/Mn=1.64). To the solution, 1.4 grams of triethylamine was added, and 1.7 grams of dimethylvinylchlorosilane was added dropwise. Agitation was continued for 4 hours at 60° to 65° C. At the end of reaction, the reaction solution was washed with 50 grams of water three times. The organic layer was dried overnight over calcium chloride. After the desiccant was filtered off, the organic layer was concentrated, obtaining 1.4 grams of a white powder.

The results of analysis of this white powder are shown below which indicate that it is a dimethylvinylsiloxy-terminated methylphenylpolysilane.

| Yield: | about 80% |
|---|---|
| Mn: | 7,600 (calculated as polystyrene) |
| Mw/Mn: | 1.86 |
| IR analysis: | peak at 3624 cm$^{-1}$ (Si—OH) disappeared |
| Proton NMR: (in C$_6$D$_6$) | −0.8–0.6 ppm (SiCH$_3$) broad 5.4–6.1 ppm (—CH═CH$_2$) broad 6.2–7.8 ppm (Ph) broad |

The process of the present invention facilitates synthesis of hydrosiloxy and alkenylsiloxy-terminated polysilanes having a relatively high degree of polymerization. The hydrosiloxy and alkenylsiloxy-terminated polysilanes allow various functional groups to be introduced therein and are useful source materials for forming copolymers with other polymers.

Although some preferred embodiments have been described, many modifications and variations may be made thereto in the light of the above teachings. It is therefore to be understood that within the scope of the appended claims, the invention may be practiced otherwise than as specifically described.

We claim:

1. A terminally reactive polysilane of the formula:

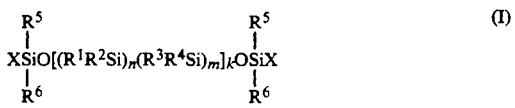

wherein R$^1$, R$^2$, R$^3$, R$^4$, R$^5$, and R$^6$ are independently monovalent hydrocarbon groups having 1 to 12 carbon atoms selected from substituted or unsubstituted alkyl or aryl groups, X is a hydrogen atom or alkenyl group, letters n, m and k are numbers in the range: $0 \leq n \leq 10$, $0 \leq m \leq 10$, $n+m \geq 10$, and $k \geq 1$.

2. The terminally reactive polysilane according to claim 1, wherein R$^1$, R$^2$, R$^3$ and R$^4$ are independently monovalent hydrocarbon groups having 1 to 8 carbon atoms selected from substituted or unsubstituted alkyl and aryl groups, and R$^5$ and R$^6$ are independently monovalent hydrocarbon groups having 1 to 6 carbon atoms selected from substituted or unsubstituted alkyl or aryl groups.

3. The terminally reactive polysilane according to claim 1 wherein $k \geq 5$.

4. The terminally reactive polysilane according to claim 1, wherein $k \leq 10$.

5. The terminally reactive polysilane of the formula:

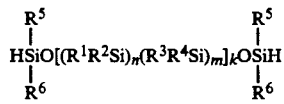

wherein R$^1$, R$^2$, R$^3$, R$^4$, R$^5$, and R$^6$ are independently monovalent hydrocarbon groups having 1 to 12 carbon atoms selected from substituted or unsubstituted alkyl or aryl groups and letters n, m and k are numbers in the range: $0 \leq n \leq 10$, $0 \leq m \leq 10$, $n+m \geq 10$, and $k \geq 1$.

6. The terminally reactive polysilane according to claim 5, wherein R$^1$, R$^2$, R$^3$ and R$^4$ are independently monovalent hydrocarbon groups having 1 to 8 carbon atoms selected from substituted or unsubstituted alkyl and aryl groups, and R$^5$ and R$^6$ are independently monovalent hydrocarbon groups having 1 to 6 carbon atoms selected from substituted or unsubstituted alkyl or aryl groups.

7. The terminally reactive polysilane according to claim 5, wherein $k \geq 5$.

8. The terminally reactive polysilane according to claim 5, wherein $k \geq 10$.

9. The terminally reactive polysilane of the formula:

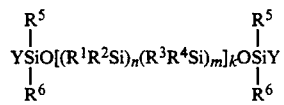

wherein R$^1$, R$^2$, R$^3$, R$^4$, R$^5$, and R$^6$ are independently monovalent hydrocarbon groups having 1 to 12 carbon atoms selected from substituted or unsubstituted alkyl or aryl groups, Y is an alkenyl group having 2 to 6 carbon atoms, and letters n, m and k are numbers in the range: $0 \leq n \leq 10$, $0 \leq m \leq 10$, $n+m \geq 10$, and $k \geq 1$.

10. The terminally reactive polysilane according to claim 9, wherein R$^1$, R$^2$, R$^3$ and R$^4$ are independently monovalent hydrocarbon groups having 1 to 8 carbon atoms selected from substituted or unsubstituted alkyl and aryl groups, and R$^5$ and R$^6$ are independently monovalent hydrocarbon groups having 1 to 6 carbon atoms selected from substituted or unsubstituted alkyl or aryl groups.

11. The terminally reactive polysilane according to claim 9 wherein $k \geq 5$.

12. The terminally reactive polysilane according to claim 9, wherein $k \geq 10$.

13. A process for preparing a terminally reactive polysilane comprising the step of reacting a hydroxy-terminated polysilane of the formula $$OH((R^1R^2Si)_n(R^3R^4Si)_m)_kOH$$

wherein $R^1$, $R^2$, $R^3$, and $R^4$ are independently monovalent hydrocarbon groups having 1 to 12 carbon atoms selected from substituted or unsubstituted alkyl or aryl groups, letters n, m and k are numbers in the range; $0 \leq n \leq 10$, $0 \leq m \leq 10$, $n + \geq 10$, and $k \geq 1$, with a member selected from the group consisting of dialkylhydrochlorosilane, alkylarylhydrochlorosilane, dialkylalkenylchlorosilane and alkyarylhydrochlorosilane, dialkylakenylchlorosilane and alkylarylalkenylchlorosilane, in the presence of an amine.

14. The process for preparing a terminally reactive polysilane according to claim 13, wherein said hydroxy-terminated dialkylpolysilane, hydroxy-terminated alkylaryl polysilane and hydroxy-terminated diarylpolysilane.

15. The process for preparing a terminally reactive polysilane according to claim 13, wherein said hydroxy-terminated polysilane is dissolved in an inert solvent prior to said reaction step.

16. The process for preparing a terminally reactive polysilane according to claim 15, wherein said inert solvent is selected from the group consisting of toluene, xylene and benzene.

17. The process for preparing a terminally reactive polysilane according to claim 13, wherein said amine is selected from the group consisting of triethylamine and pyridine.

18. The process for preparing a terminally reactive polysilane according to claim 13, wherein said amine is present in an amount of 0.1 to 10% by weight based on the weight of the hydroxy-terminated polysilane.

19. The process for preparing a terminally reactive polysilane according to claim 13, wherein said amine is present said hydroxy-terminated polysilane in an amount of 1 to 5% by weight based on the weight of the hydroxy-terminated polysilane.

* * * * *